United States Patent
Oogami

(10) Patent No.: US 10,234,653 B2
(45) Date of Patent: Mar. 19, 2019

(54) IMAGING DEVICE WITH FOCUS LENS STOPPED AT EACH OF FOCUS POSITIONS DURING VIDEO CAPTURING

(71) Applicant: PANASONIC INTELLECTUAL PROPERTY MANAGEMENT CO., LTD., Osaka (JP)

(72) Inventor: Tomohiro Oogami, Nara (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/898,506

(22) Filed: Feb. 17, 2018

(65) Prior Publication Data

US 2018/0172949 A1 Jun. 21, 2018

Related U.S. Application Data

(63) Continuation of application No. PCT/JP2016/004774, filed on Oct. 31, 2016.

(30) Foreign Application Priority Data

Nov. 24, 2015 (JP) .................................. 2015-228330

(51) Int. Cl.
*G02B 7/04* (2006.01)
*G02B 7/36* (2006.01)
(Continued)

(52) U.S. Cl.
CPC ................. *G02B 7/36* (2013.01); *G02B 7/04* (2013.01); *H04N 5/232* (2013.01);
(Continued)

(58) Field of Classification Search
CPC ...... G02B 7/36; G02B 7/04; H04N 5/232125; H04N 5/232127; H04N 5/232133; H04N 5/232; H04N 5/378
See application file for complete search history.

(56) References Cited

U.S. PATENT DOCUMENTS 8,300,136 B2 * 10/2012 Yamasaki ................ G02B 7/36
348/333.02
2005/0007486 A1 * 1/2005 Fujii .................. H04N 5/23212
348/345
(Continued)

FOREIGN PATENT DOCUMENTS

JP 06-78210 A 3/1994
JP 2000-224458 A 8/2000
(Continued)

OTHER PUBLICATIONS

English translation of the international preliminary report on patentability in connection with International Application No. PCT/JP2016/004774, dated Jun. 7, 2018.
(Continued)

*Primary Examiner* — Nicholas G Giles
(74) *Attorney, Agent, or Firm* — Renner Otto Boisselle & Sklar, LLP

(57) ABSTRACT

In the case in which a plurality of regions which is obtained by dividing an image region of the image data is set as partial regions, a controller detects focus positions respectively with respect to the partial regions and moves a focus lens to each of the detected focus positions to capture a video. The controller has, as a video capturing method for the video capturing, a first method in which the video capturing is performed with the focus lens stopped at each of the focus positions, and a second method in which the video capturing is performed with the focus lens being moved without stopped at each of the focus positions.

7 Claims, 21 Drawing Sheets

(51) Int. Cl.
*H04N 5/232* (2006.01)
*H04N 5/378* (2011.01)

(52) U.S. Cl.
CPC . *H04N 5/232125* (2018.08); *H04N 5/232127* (2018.08); *H04N 5/232133* (2018.08); *H04N 5/378* (2013.01)

(56) References Cited

U.S. PATENT DOCUMENTS

| | | | |
|---|---|---|---|
| 2006/0007322 A1* | 1/2006 | Nakamura | H04N 5/232 348/222.1 |
| 2006/0238641 A1 | 10/2006 | Konishi | |
| 2009/0047010 A1 | 2/2009 | Yoshida et al. | |
| 2010/0322611 A1 | 12/2010 | Yoshida et al. | |
| 2013/0182900 A1* | 7/2013 | Ishii | H04N 5/23212 382/103 |
| 2016/0349522 A1* | 12/2016 | Onuki | H04N 5/374 |
| 2017/0134605 A1* | 5/2017 | Ju | H04N 1/2125 |

FOREIGN PATENT DOCUMENTS

| | | |
|---|---|---|
| JP | 2004-135029 A | 4/2004 |
| JP | 2006-25311 A | 1/2006 |
| JP | 2006-301378 A | 11/2006 |
| JP | 2009-80458 A | 4/2009 |

OTHER PUBLICATIONS

International Search Report (PCT/ISA/210) for corresponding International Application PCT/JP2016/004774, dated Jan. 24, 2017.

* cited by examiner

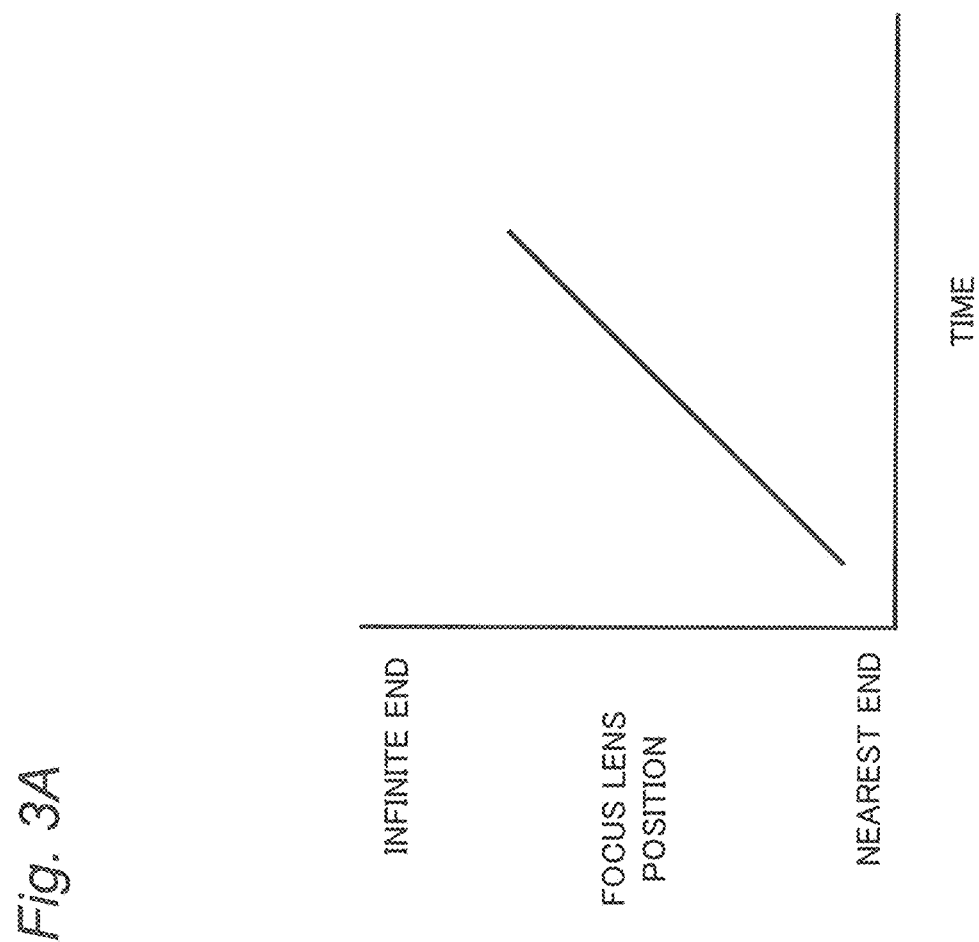

Fig. 6A

FOCUS INFORMATION TABLE

| | FOCUS LENS POSITION OF NEAREST END SIDE (Pnear) | FOCUS LENS POSITION OF MOST INFINITE END SIDE (Pfar) |
|---|---|---|
| a | 10 | 200 |

60

| | 1st AF REGION | 2nd AF REGION | 3rd AF REGION | ... | 19th AF REGION | ... | 49th AF REGION |
|---|---|---|---|---|---|---|---|
| b FRAME NUMBER | 5 | 43 | 36 | ... | 50 | ... | 100 |
| c FOCUS LENS POSITION (FOCUS POSITION) | 10 | 100 | 75 | ... | P | ... | 200 |

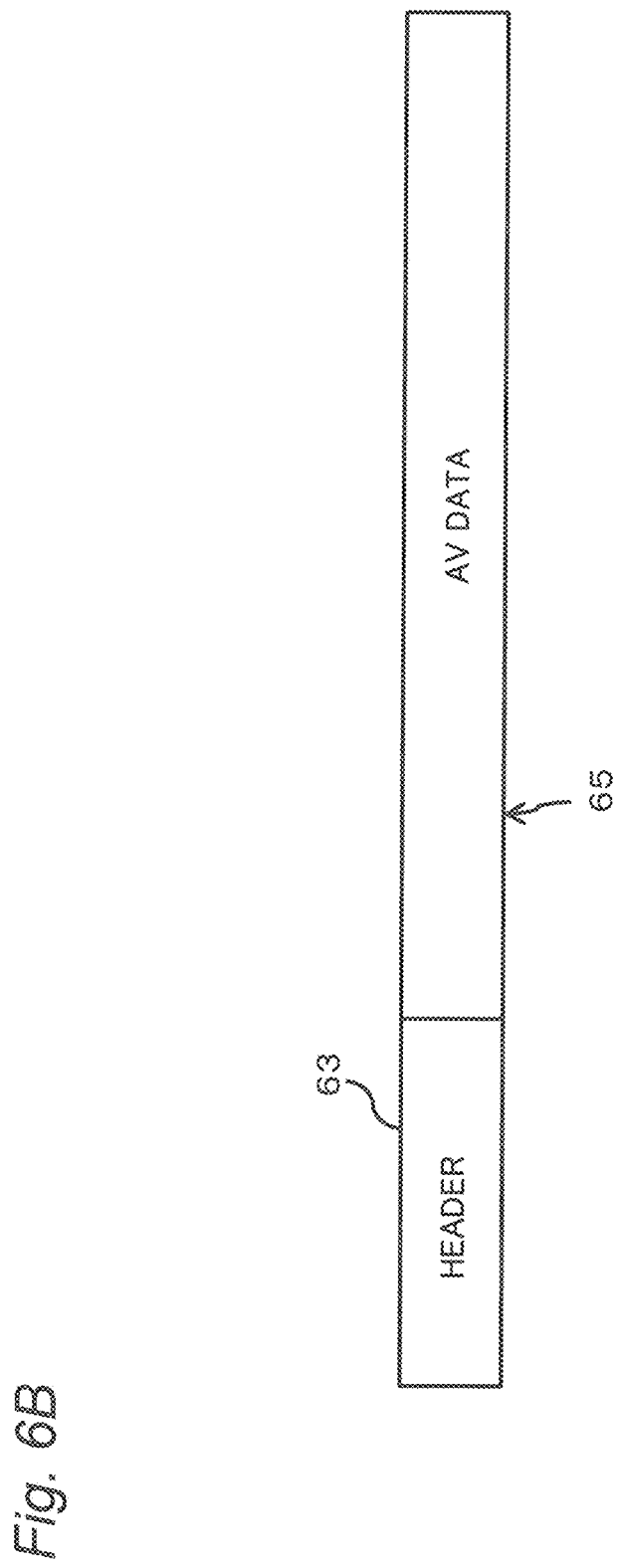

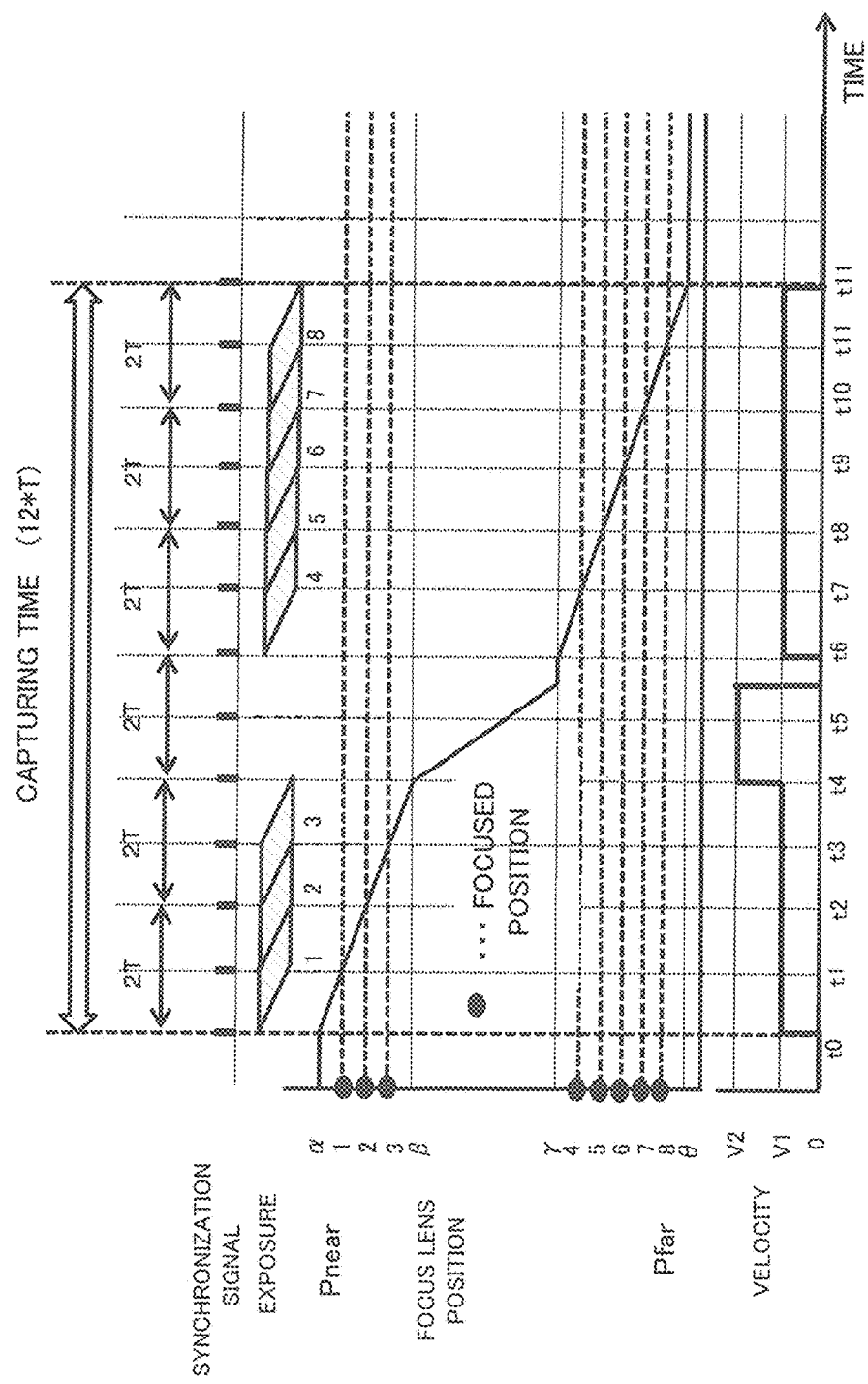

Fig. 10D

| FOCUS LENS POSITION | 1 | 2 | 3 | ... | ... | 200 |
|---|---|---|---|---|---|---|
| VARIATION AMOUNT OF FOCUS OBJECT POSITION | Cf1 | Cf2 | Cf3 | ... | Cfi | Cf200 |

IMAGING DEVICE WITH FOCUS LENS STOPPED AT EACH OF FOCUS POSITIONS DURING VIDEO CAPTURING

CROSS-REFERENCE TO RELATED APPLICATIONS

This is a continuation application of International Application No. PCT/JP2016/004774, with an international filing date of Oct. 31, 2016, which claims priority of Japanese Patent Application No.: 2015-228330 filed on Nov. 24, 2015, the content of which is incorporated herein by reference.

BACKGROUND

1. Technical Field

The present disclosure relates to an imaging device that has a focus bracket capturing function capable of capturing by one operation a plurality of images at different focus positions.

2. Related Art

Unexamined Japanese Patent Publication No. 2004-135029 discloses a digital camera that has a focus bracket capturing function capable of capturing by one operation a plurality of images at different focus positions.

SUMMARY

The present disclosure provides an imaging device capable of capturing according to the priority of an image quality and a recording time when capturing a plurality of images using focus bracket capturing function.

The present disclosure according to a first aspect provides an imaging device. The imaging device includes an optical system that includes a focus lens; an imaging unit that captures an object image formed by the optical system to generate an image signal; an image processor that performs a predetermined process to the image signal generated by the imaging unit to generate image data; and a controller that controls the imaging unit and the image processor. In the case in which a plurality of regions which is obtained by dividing an image region of the image data is set as partial regions, the controller detects focus positions respectively with respect to the partial regions and moves the focus lens to each of the detected focus positions to capture a video. The controller has, as a video capturing method for the video capturing, a first method in which the video capturing is performed with the focus lens stopped at each of the focus positions, and a second method in which the video capturing is performed with the focus lens being moved without stopped at each of the focus positions.

The imaging device of the present disclosure can capture images of high focus precision and an excellent image quality by setting the first method in which the video capturing is performed with the focus lens stopped at each focus position, as the video capturing method. Further, the imaging device can shorten recording time of the video capturing, by setting the second method in which the video capturing is performed with the focus lens being moved without stopped at each focus position. Therefore, a capturing according to a priority with respect to an image quality and a recording time can be performed.

BRIEF DESCRIPTION OF DRAWINGS

FIG. 3A is an explanatory view of movement of a focus lens in a bracket operation.

FIG. 6A is a diagram explaining a focus information table.

FIG. 6B is an explanatory view of a header of video-image data.

FIG. 10B is an explanatory diagram of changeover of a moving speed of the focus lens.

FIG. 10D is a diagram describing a table in which there is recorded a variation amount of a focus object position corresponding to each focus lens position.

DETAILED DESCRIPTION

Exemplary embodiments will be described below in detail with reference to the drawings as necessary. However, more than necessary detailed descriptions will sometimes be omitted. For example, detailed descriptions for matters which have already been well known in the art and redundant descriptions for substantially the same configurations will sometimes be omitted. This is to prevent the description below from becoming unnecessarily redundant, and to facilitate understanding of a person skilled in the art. Note that the accompanying drawings and the following description are provided by the inventors in order for the person skilled in the art to sufficiently understand the present disclosure, and are not intended to limit the subject matter set forth in the claims.

Exemplary embodiments of an imaging device according to the present disclosure will be described below with reference to the drawings.

First Embodiment

1. Configuration of Digital Camera

Figure 1:
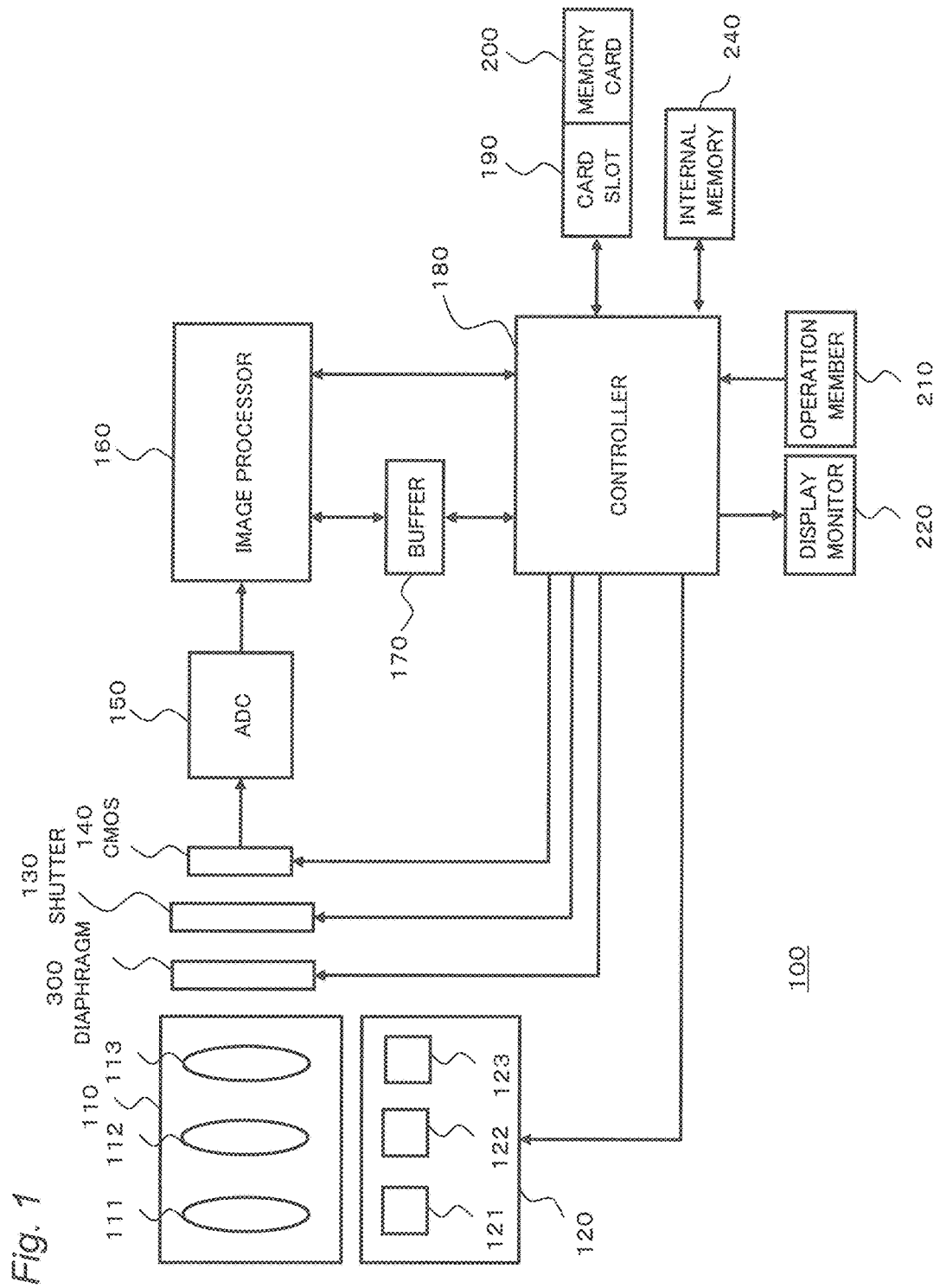
FIG. 1 is a diagram illustrating a configuration of a digital camera according to the present disclosure.

An electrical configuration of a digital camera according to a first embodiment will be described with reference to FIG. 1. FIG. 1 is a block diagram illustrating a configuration of a digital camera 100. The digital camera 100 is an imaging device that captures an object image formed by an optical system 110 consisting of one or a plurality of lenses, with a CMOS 140. Image data generated by the CMOS 140 undergoes various processes in an image processor 160, and is stored in a memory card 200. The configuration of the digital camera 100 will be described below in detail.

The optical system 110 includes a focus lens 111 and a zoom lens 112. The optical system 110 can enlarge and reduce an object image by moving the zoom lens 112 along an optical axis. The optical system 110 can adjust a focus (a focus state) of an object image by moving the focus lens 111 along the optical axis. Further, the optical system 110 includes a shake correction lens 113 for correcting a blur of the image due to a shake of the digital camera 100.

A lens driver 120 drives various lenses included in the optical system 110. The lens driver 120 includes a zoom motor 122 that drives the zoom lens 112, a focusing motor 121 that drives the focus lens 111, and a shake correction actuator 123 that drives the shake correction lens 113, for example.

A diaphragm 300 adjusts a size of an aperture according to a user setting or automatically, to adjust an amount of light transmitting through the aperture.

A shutter 130 is a unit that blocks light transmitting to the CMOS 140. The shutter 130 constitutes an optical system unit that controls optical information indicating an object image, together with the optical system 110 and the diaphragm 300. The optical system 110 and the diaphragm 300 are accommodated in a lens barrel (not shown).

The CMOS 140 captures an object image formed by the optical system 110 to generate image data. The CMOS 140 includes a color filter, a light-receiving element, and an AGC (Auto Gain Controller). The light-receiving element converts an optical signal collected by the optical system 110 into an electric signal to generate image information. The AGC amplifies the electric signal output from the light-receiving element. The CMOS 140 further includes a drive circuit that performs various operations such as exposure, transfer, electronic shutter, and the like. The details will be described later.

An ADC 150 (A/D converter: analog-digital converter) converts analog image data generated by the CMOS 140 into digital image data.

The image processor 160 performs various processes to the digital image data, which is generated by CMOS 140 and converted, in response to the control of controller 180. The image processor 160 generates image data that is to be displayed onto a display monitor 220, and also generates image data that is to be stored into the memory card 200. For example, the image processor 160 performs various processes such as gamma correction, white balance correction, and flaw correction to the image data generated by the CMOS 140. The image processor 160 compresses the image data generated by the CMOS 140 in a compression format or the like according to H.264 standard and MPEG2 standard. The image processor 160 can be implemented by a DSP (Digital Signal Processor) or a microcomputer. Further, the image processor 160 can generate image data of a video having about 4000 times 2000 pixels (4K video-image data), based on the image data generated by the CMOS 140. The image processing unit 160 can perform various processes described below to the generated 4k video-image data.

The controller 180 is a control unit that entirely controls the digital camera 100. The controller 180 can be implemented by a semiconductor element or the like. The controller 180 may be configured by only hardware, or may be implemented by a combination of hardware and software. The controller 180 can be implemented by a microcomputer, a CPU, an MPU, a DSP, an ASIC, an FPGA, and the like.

A buffer 170 functions as a work memory for the image processor 160 and the controller 180. The buffer 170 can be implemented by a DRAM (Dynamic Random Access Memory), a ferroelectric memory, or the like, for example.

A card slot 190 is a unit for attaching the memory card 200 to the digital camera 100. The card slot 190 can mechanically and electrically connect the memory card 200 to the digital camera 100.

The memory card 200 includes therein a flash memory, a ferroelectric memory, or the like, and can store data such as an image file generated by the image processor 160.

An internal memory 240 is configured by a flash memory, a ferroelectric memory, or the like. The internal memory 240 stores a control program, data, and the like for controlling the whole of the digital camera 100.

An operation member 210 is a general term for a user interface accepting an operation from a user. The operation member 210 includes a button, a lever, a dial, a touch panel, and a switch that accepts an operation from a user. Further, the operation member 210 includes a focus ring provided on an outer circumference of the lens barrel. The focus ring is a member that is rotated by a user when moving the focus lens 111.

The display monitor 220 can display an image (a through image) indicated by image data generated by the CMOS 140, and an image indicated by image data read from the memory card 200. Further, the display monitor 220 can also display various menu screens on which the user performs various settings of digital camera 100. The display monitor 220 is formed of a liquid-crystal display device and an organic EL display device.

Figure 2:
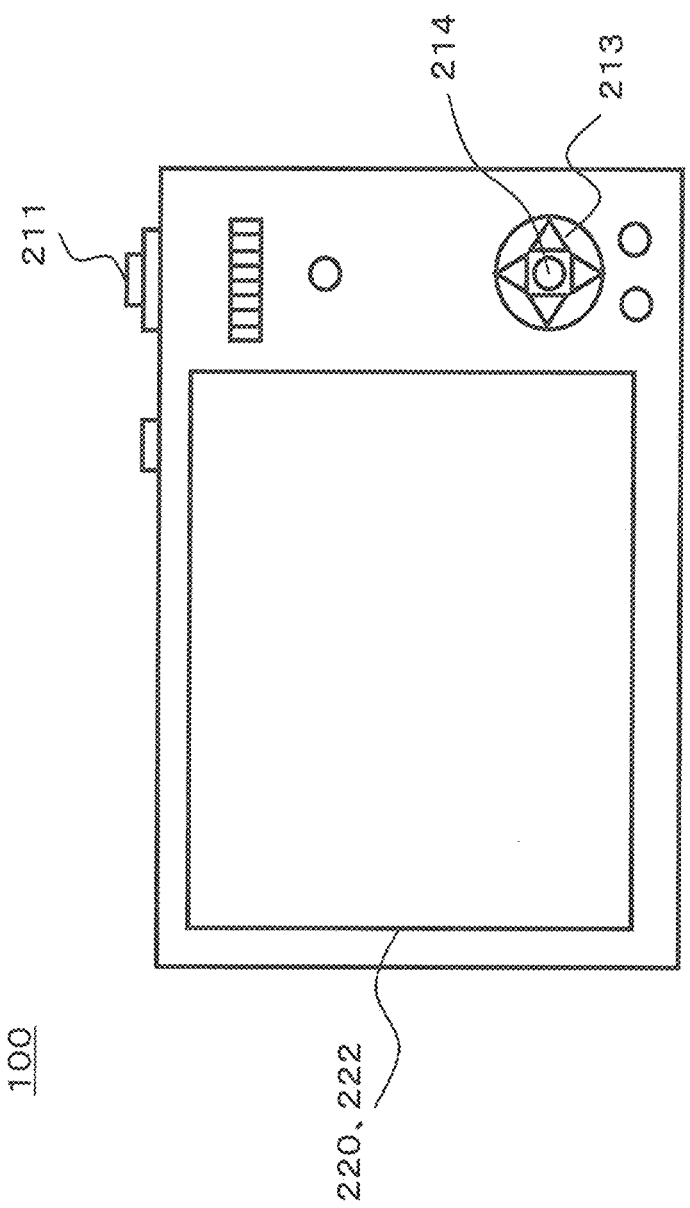
FIG. 2 is a back view of the digital camera.

FIG. 2 is a diagram describing a back surface of the digital camera 100. A release button 211, selection buttons 213, an enter button 214, and a touch panel 222 is shown in FIG. 2 as examples of the operation member 210. When accepting an operation from the user, operation member 210 transmits various instruction signals to controller 180.

The release button 211 is a two-step push button. When the release button 211 is half pressed by the user, the controller 180 executes an auto-focus control (AF control), an auto-exposure control (AE control), or the like. When the release button 211 is fully pressed by the user, the controller 180 records image data which is captured at a timing of the pressing operation as a record image, onto the memory card 200 or the like.

The selection button 213 is a push button provided at upper, lower, left, and right sides. The user can move a cursor or select one of various condition items displayed on the display monitor 220 by pressing selection buttons 213 at any of upper, lower, left, and right sides.

The enter button 214 is a push button. When the enter button 214 is pressed by the user when the digital camera 100 is in a capturing mode or in a reproduction mode, the controller 180 displays a menu screen on the display monitor

220. The menu screen is a screen used for setting various conditions for capturing/reproduction. When the enter button 214 is pressed while a setting item of various conditions is selected, the controller 180 determines the setting of the selected items.

The touch panel 222 is disposed on a display screen of the display monitor 220, and detects a touch operation with a user finger on the display screen. Accordingly, the user can perform various operations such as an assign of a region of an image displayed on the display monitor 220.

1.1 Focus Bracket Function

The digital camera 100 of the present embodiment has a focus bracket function for capturing a video, changing a focus position, and selecting one frame image from a plurality of frame images constituting a captured video. With the focus bracket function, a 4k video-image having about 4000 times 2000 pixels is recorded. A frame image which is selected based on user designation is cut out from the recorded 4k video-image, thereby obtaining a still image.

Figure 3B:
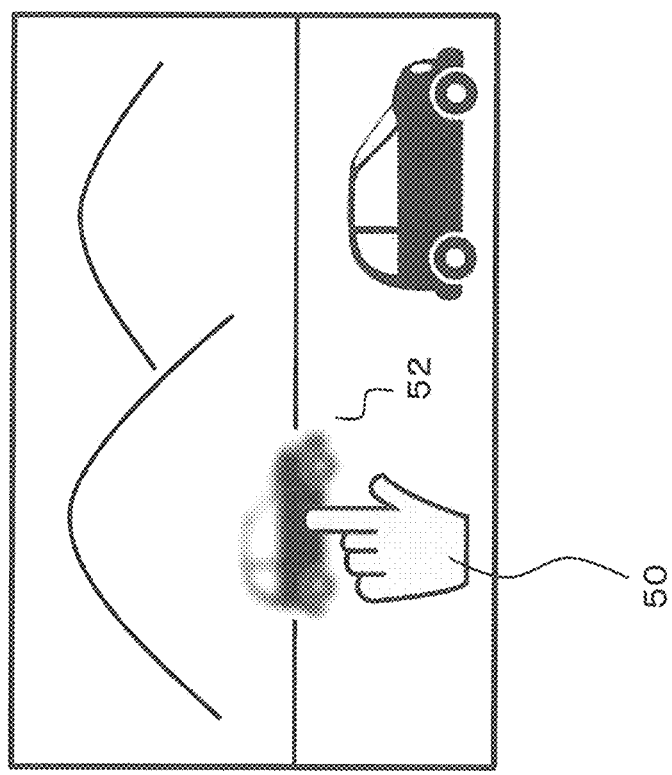
FIG. 3B is an explanatory view of assignment by a user of a focus region in an image.
Figure 4:
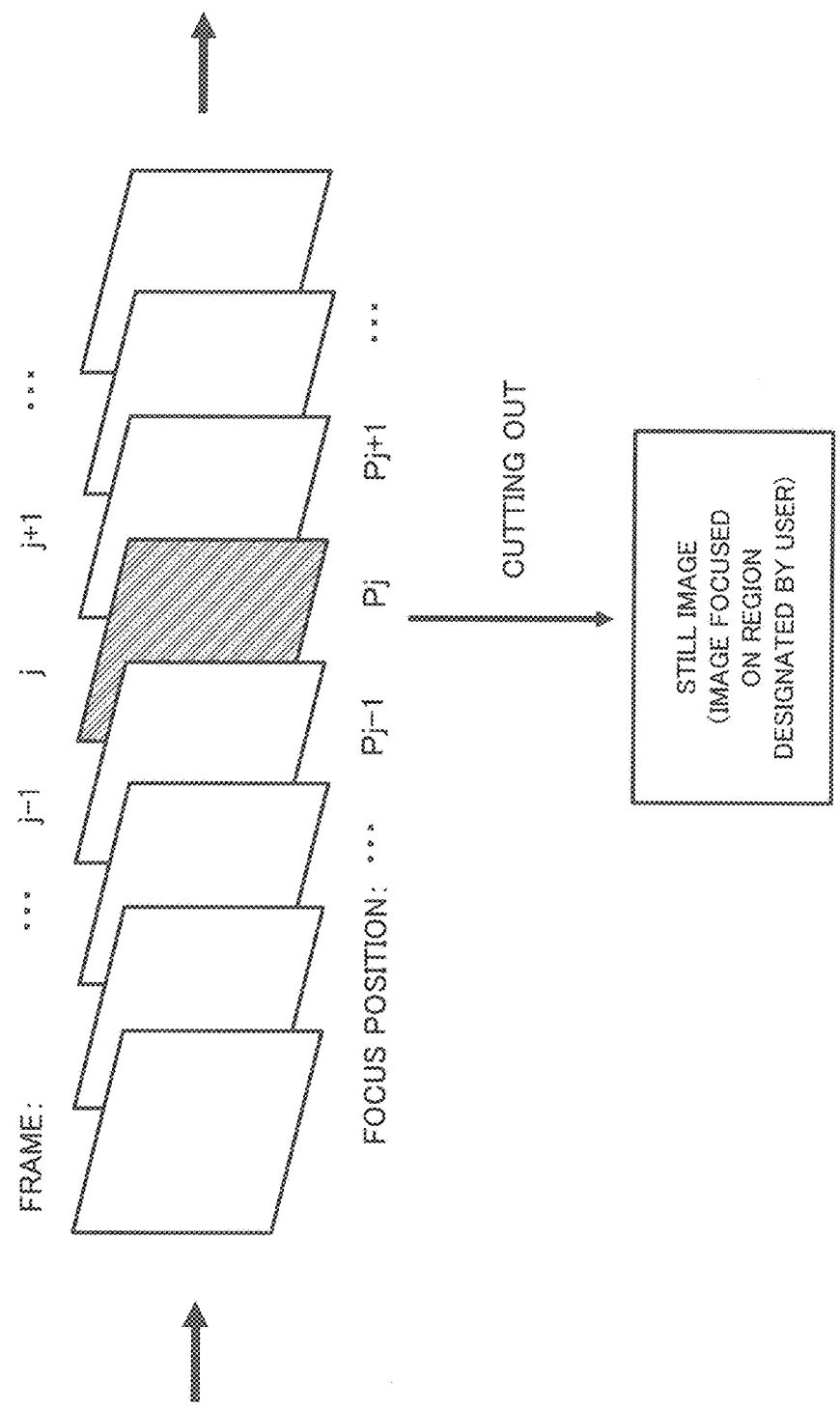
FIG. 4 is a diagram illustrating cutting out of a still image from video-image data.

Specifically, in the focus bracket function, a video capturing is performed with the focus lens 111 being moved from a near-end side toward an infinite-end side (or, in an opposite direction), that is, with a focus position being changed, as shown in FIG. 3A. Thereafter, as shown in FIG. 3B, a user 50 assigns an object 52 (that is, a region) that is desired to be focused in the captured image. As shown in FIG. 4, the digital camera 100 selects a frame image from a plurality of frame images constituting the video, based on assignment by the user, and cuts out and records the selected frame image as a still image. Accordingly, a high quality still image which is focused on an object (a region) assigned by the user can be obtained.

Figure 5B:
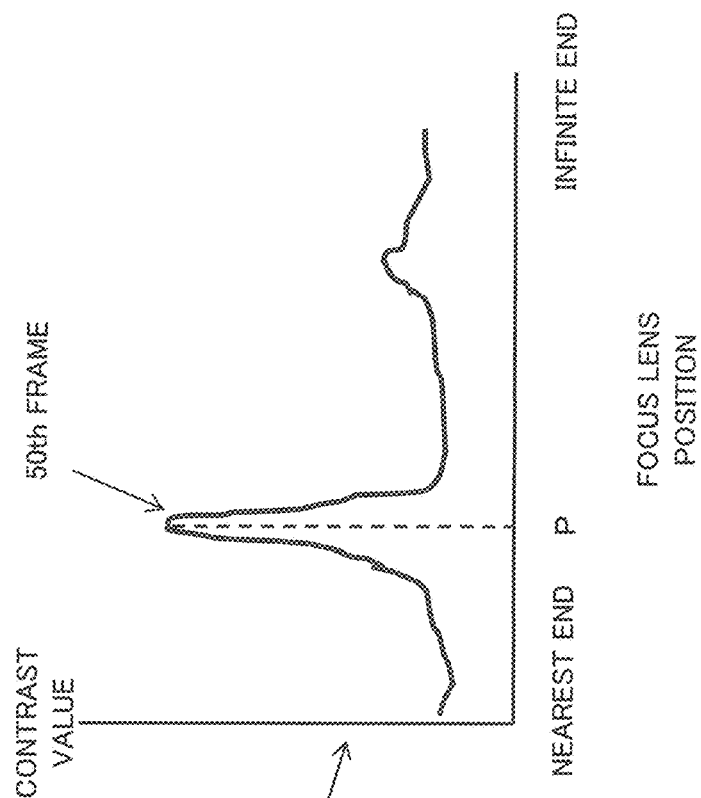
FIGS. 5A and 5B are explanatory diagrams of a plurality of divided image regions.
Figure 5A:
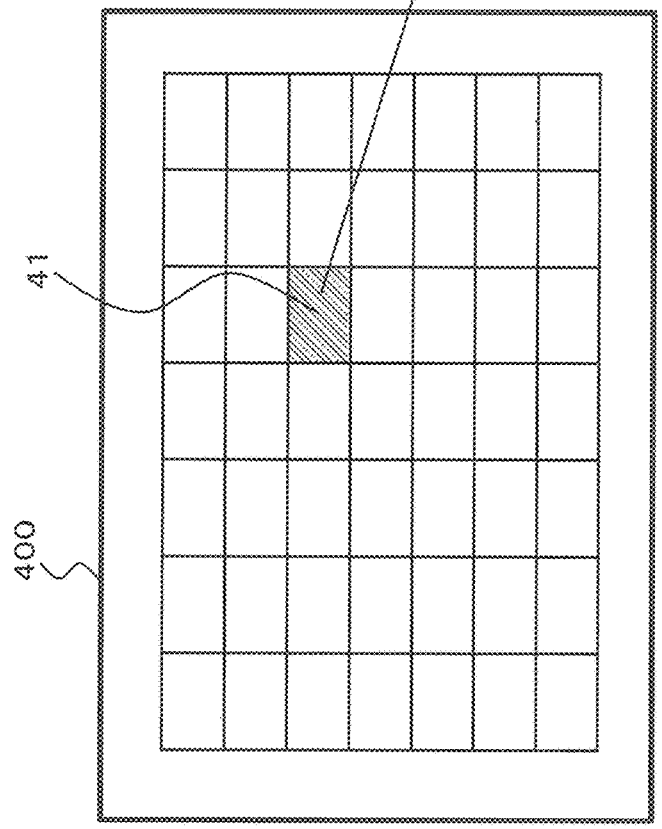

In the present embodiment, for the above focus bracket, an image region 400 is divided into a plurality of regions as shown in FIGS. 5A and 5B. Then, with respect to each of the divided regions, a frame which is focused on each divided region (hereinafter, referred to as a "focused frame") is obtained from a plurality of frames constituting a video. Information concerning the obtained focused frame is recorded in a focus information table. The digital camera 100 performs a pre-scanning operation before recording (capturing) a video in a focus bracket operation. The digital camera 100 detects a focused frame with respect to each divided region, and generates the focus information table. The plurality of regions which are obtained by dividing the image region 400 are also referred to as partial regions.

FIG. 6A is a diagram describing a data structure of the focus information table. The focus information table 60 stores a focus lens position (Pnear) corresponding to a focus position nearest to the near end side among the focus positions obtained in the pre-scanning operation, a focus lens position (Pfar) corresponding to a focus position nearest to the most-infinite end side among the focus positions obtained in the pre-scanning operation, and a frame number of a focused frame with respect to each divided region. The focus information table 60 is stored in a header 63 of video-image data 65 obtained by video capturing, as shown in FIG. 6B. In the following, the focus lens position (Pnear) will be appropriately referred to as a focus position (Pnear), and the focus lens position (Pfar) will be appropriately referred to as a focus position (Pfar).

2. Focus Bracket Operation

A focus bracket operation of the digital camera 100 which has the above configuration will be described below.

Figure 7:
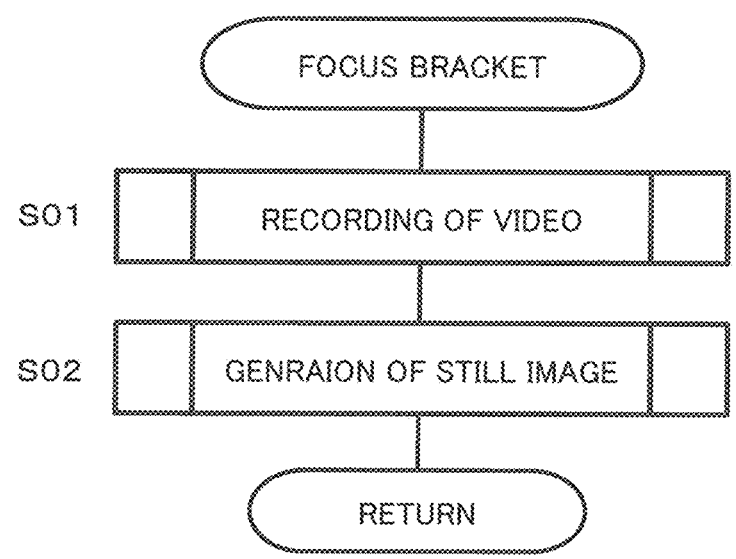
FIG. 7 is a flowchart illustrating a focus bracket operation.

A video recording operation in the focus bracket operation of the digital camera 100 will be described with reference to a flowchart in FIG. 7. When the release button 211 is fully pressed by the user in a state that the focus bracket function of the digital camera 100 is set valid, the focus bracket operation is started. The focus bracket operation includes a video recording operation (S01), and a still image generation operation (S02). In the video recording operation, a video is recorded (captured) with the focus lens 111 being moved. In the still image generation operation, a still image which is focused on an object (a region) designated by the user is generated from video-image data recorded by the video recording operation. Each operation will be described in detail below.

2.1 Video Recording Operation

Figure 8:
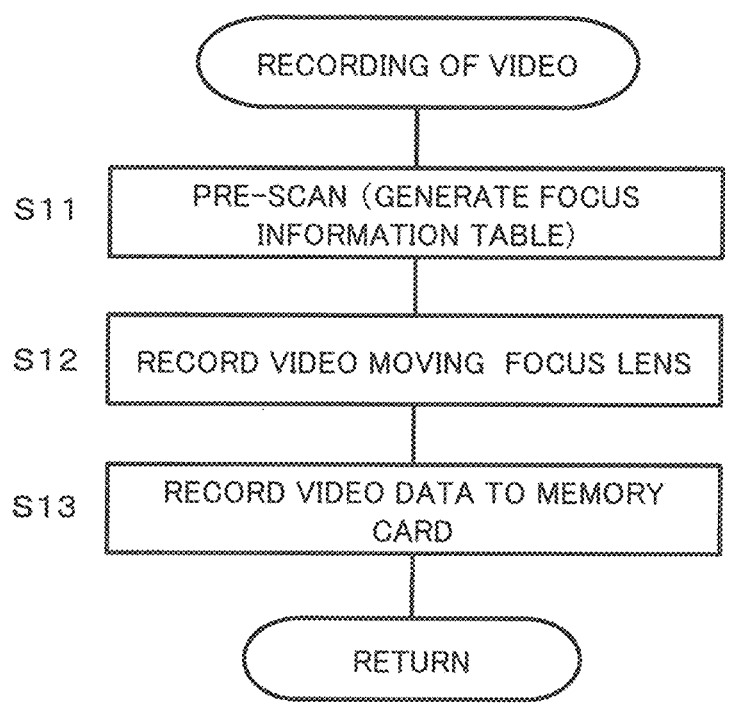
FIG. 8 is a flowchart illustrating a video recording operation in focus bracket capturing.

FIG. 8 is a flowchart for explaining the video recording operation (step S01). First, the controller 180 performs the pre-scanning operation for detecting focus positions with respect to each divided region of the image region to generate the focus information table (S11).

In the pre-scanning operation, the controller 180 detects a contrast value with respect to each divided image region, moving the focus lens 111 from a near end to an infinite end (or, in an opposite direction) (refer to FIGS. 5A and 5B).

Then, the controller 180 generates the focus information table 60 based on a result of the pre-scanning. Specifically, the controller 180 obtains, with respect to each partial region, a focus lens position at which a contrast value becomes the largest in a plurality of obtained images when moving the focus lens 111 from the near end to the infinite end. The controller 180 records the focus lens position into the focus information table 60 (refer to c in FIG. 6A). Further, when contrast values of all frames with respect to a certain region are lower than a predetermined threshold value, a focused frame (that is, a focus position) for the certain region is not determined. Then, a predetermined value indicating that a focus position is unknown is recorded into the focus information table 60.

The controller 180 further obtains the focus position (Pnear) of the focus lens 111 nearest the near end and the focus position (Pfar) of the focus lens 111 nearest the infinite end, when the focus lens 111 is moved from the near end to the infinite end. The controller 180 records values of these focus positions into the focus information table 60 (refer to a in FIG. 6A). Then, the controller 180 ends the pre-scanning operation. In the state, the focus information table 60 does not yet include the information of the frame number of the focused frame.

Figure 9:
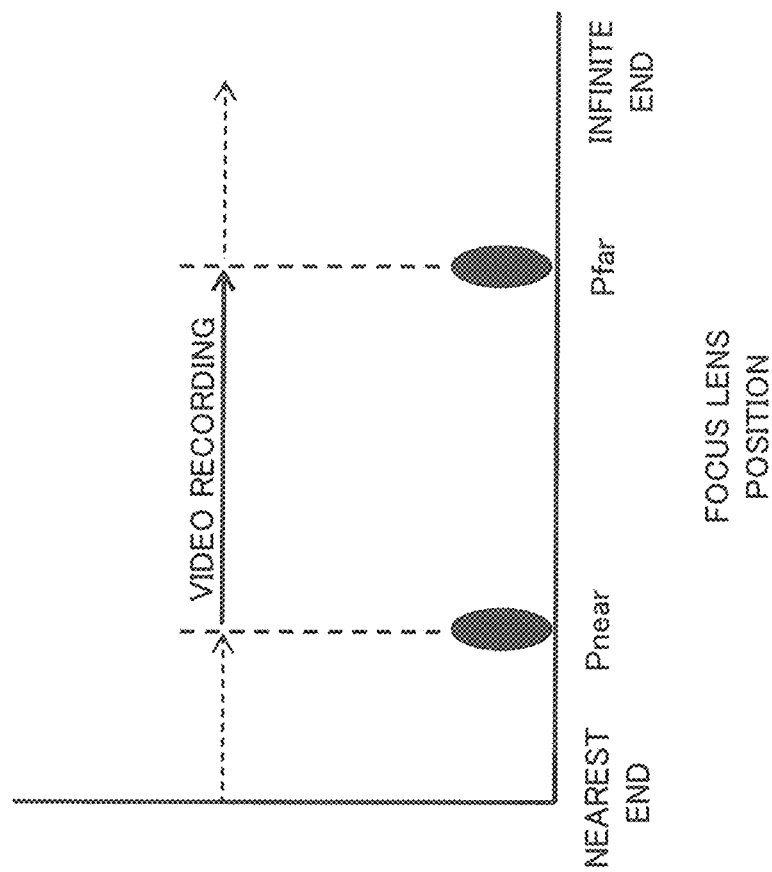
FIG. 9 is an explanatory diagram of a moving range of a focus lens in focus bracket capturing.

After ending the pre-scanning operation, the controller 180 returns the focus lens 111 to the near-end side, and performs a video recording, moving the focus lens 111 within a predetermined range (S12). The predetermined range is a range from the focus position (Pnear) of the focus lens 111 which is nearest the near end, to the focus position (Pfar) of the focus lens 111 which is nearest the infinite end, as shown in FIG. 9. The moving range of the focus lens 111 is limited to such a range as the above, thus the video recording in a range in which a focus cannot be obtained is not performed. As a result, a time for a video recording can be reduced. The video recording is performed according to a predetermined format for the video image data. For example, a video is recorded according to the MP4 standard (H.264/MPEG-4 AVC system).

After the video recording ends, the controller 180 records the video-image data 65 in which the focus information table 60 is recorded to the header 63, into the memory card 200 (S13), and ends the video recording operation.

In the present embodiment, the digital camera 100 has, as video capturing methods for the focus bracket, a first method in which a video capturing is performed with the focus lens 111 stopped at each of at least one focus position, and a second method in which a video capturing is performed with the focus lens 111 being always moved in a part or a whole part of an exposure section of the CMOS 140.

The digital camera 100 has a manual mode and an automatic mode as modes for setting a video capturing method. In the manual mode, the user can manually set a desired method of the first method and the second method as a video capturing method by operating the operation member 210. In the automatic mode, the controller 180 automatically sets any one of the first method and the second method as a video capturing method according to presence or absence of a movement of the object and depth of field at the focus position.

Figure 10A:
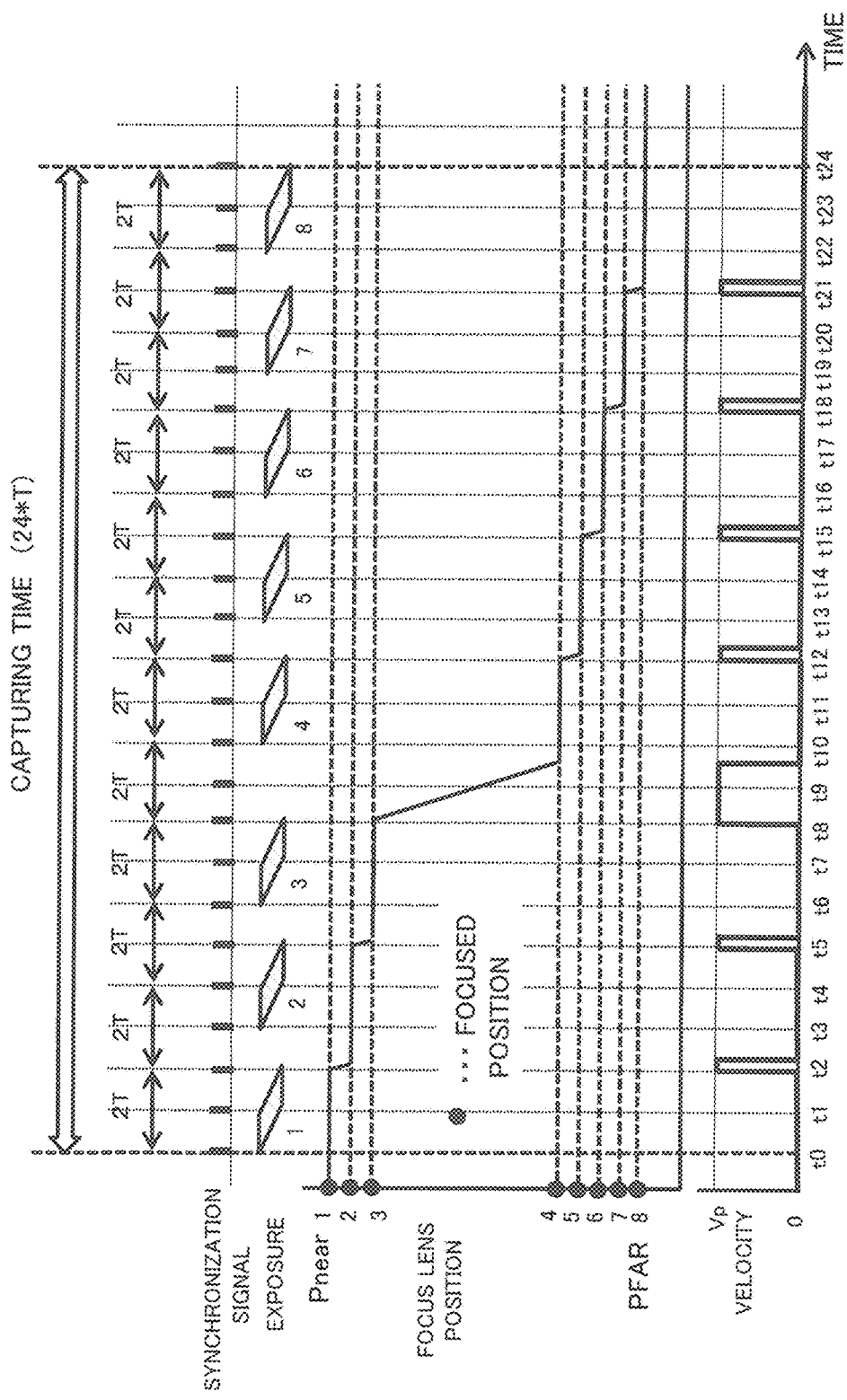
FIG. 10A is an explanatory diagram of changeover of a moving speed of the focus lens.

FIG. 10A is a time chart of a focus bracket operation in the first method. FIG. 10B is a time chart of a focus bracket operation in the second method. These time charts shows the case in which eight focus positions are detected in the pre-scanning operation. The detected focus positions are indicated by black circles 1 to 8 in FIG. 10A and FIG. 10B, in order of the focus positions, from the near end to the infinite end. A focus position indicated by the black circle 1 (a first focus position) is the focus position (Pnear) of the focus lens 111 nearest the near end. A focus position indicated by the black circle 8 (an eighth focus position) is the focus position (Pfar) of the focus lens 111 nearest the infinite end. During the video recording operation, the focus lens 111 is moved in the range from the focus position (Pnear) of the focus lens 111 nearest the near end, to the focus position (Pfar) of the focus lens 111 nearest the infinite end.

As shown in FIGS. 10A and 10B, the controller 180 of the digital camera 100 outputs a synchronization signal by a predetermined cycle (T). The synchronization signal is a signal for controlling synchronization of a capturing operation of the digital camera 100, such as a vertical synchronization signal, for example. The predetermined cycle (T) is set based on a frame rate of a captured image, such as 1/30 second or 1/60 second, for example. In FIGS. 10A and 10B indicate a case where an exposure time and the cycle T are the same. Further, times when the synchronization signals are output are indicated by t1 to t24. Time of the exposure in FIGS. 10A and 10B includes time of a transfer (reading) of exposure data.

According to the first method shown in FIG. 10A, the controller 180 stops the focus lens 111 completely at each focus position at least during each exposure of each frame image (during the exposure time). After the exposure ends, the controller 180 moves the focus lens 111 to a next focus position at a predetermined speed Vp. During a period in which the focus lens 111 is moved to the next focus position, the controller 180 does not make the CMOS 140 perform exposure operation. The predetermined speed Vp may be set to the highest speed at which an actuator (the focusing motor 121) of the focus lens 111 can operate.

An example of the capturing operation in FIG. 10A will be described in detail. From time t0 to time t2, the controller 180 stops the focus lens 111 at the focus position 1 and makes the CMOS 140 perform exposure of the frame 1. When the exposure of the frame 1 ends at time t2, the controller 180 moves the focus lens 111 to a next focus position 2 at the predetermined speed Vp. During a period from time t2 to t3 in which this movement is performed, the controller 180 does not make the CMOS 140 perform the exposure operation.

After the focus lens 111 reaches the focus position 2, the controller 180 makes the CMOS 140 perform exposure of the frame 2 from time t3 to t5 in which the next synchronization signal is output. When the exposure of the frame 2 ends at time t5, the controller 180 moves the focus lens 111 to a next focus position 3 at the predetermined speed Vp. During a period from time t5 to t6 in which the movement is performed, the controller 180 does not make the CMOS 140 perform the exposure operation.

Thereafter, a similar operation is repeated with respect to each of the focus positions 3 to 8. As described above, according to the first method, during exposure of each frame image, the controller 180 stops the focus lens 111 at each focus position, and moves the focus lens 111 to a next focus position after completing the exposure. Then, during a period in which the focus lens 111 is moved, the controller 180 does not make the CMOS 140 perform the exposure operation. Therefore, in the case in which images of eight frames are captured as shown in FIG. 10A, a total capturing time becomes 24*T, which is a sum of an exposure time (8*2T) of the eight frames and a non-exposure time (8*T) for movement between the focus positions at seven times. The non-exposure time is not 7*T but is 8*T, because 2T is used for one movement from time t8 to t10.

According to the second method shown in FIG. 10B, the controller 180 makes the CMOS 140 perform exposure of each frame image, moving the focus lens 111 without stopping the focus lens 111 at the focus position, in a part or a whole part of the exposure section of the CMOS 140, that is, at a barycenter position of exposure of the CMOS 140. The barycenter position of exposure is a position of a barycenter of an exposure region of each of the frames 1 to 8 (a parallelogram) shown in FIG. 10B. For example, the barycenter position of the frame 1 is on t1, at which 1T passes from start of the exposure. In the case in which the CMOS 140 has high performance, a barycenter position of the frame 1 is on time at which a time less than 1T passes from start of the exposure. That is, the barycenter position of the frame 1 is on t0 to t1. The controller 180 moves the focus lens 111 at a first speed V1 between adjacent focus positions. A magnitude of the first speed V1 will be described later. On the other hand, between non-adjacent focus positions, the controller 180 moves the focus lens 111 at a second speed V2 faster than the first speed V1. The second speed V2 may be set to the highest speed at which an actuator (the focusing motor 121) of the focus lens 111 can operate.

The example shown in FIG. 10B will be described in detail. During the period from time t0 to time t4, the controller 180 makes the CMOS 140 continuously perform the exposure (including the transfer) of the frames 1, 2, and 3 corresponding to the adjacent focus positions 1, 2, and 3. When the exposure of the frame 3 ends at time t4, the controller 180 moves the focus lens 111 toward the next focus position 4 not adjacent to the focus position 3. During the period from time t4 to t6 in which this movement is performed, the controller 180 does not make the CMOS 140 perform the exposure operation. During the period from time t6 to time t11, the controller 180 makes the CMOS 140 continuously perform the exposure (including the transfer) of the frames 4, 5, 6, 7, and 8 corresponding to the adjacent focus positions 4, 5, 6, 7, and 8.

In this case, the controller 180 moves the focus lens 111 at the first speed V1 during a section from α to β which includes a section between the first focus position 1 and the third focus position 3, and during a section from γ to θ which includes a section between the fourth focus position 4 and the eighth focus position 8. On the other hand, during a section from β to γ, the controller 180 moves the focus lens 111 at the second speed V2 faster than the first speed V1. In this way, in the second method, the controller 180 performs video capturing, always moving the focus lens 111 without stopping the focus lens 111 from the first focus position to the eighth focus position, except during a part of the period from t5 to t6. Therefore, in the case where images of eight frames are captured as shown in FIG. 10B, a total capturing time becomes 12*T, which includes an exposure time (10*T) for the eight frames and a non-exposure time (2*T) for movement at the second speed V2 between the third focus position and the fourth focus position.

In this case, the first speed V1 is set to a speed at which the focus lens 111 passes the focus position of each frame at a center timing of the exposure time. The second method is set, when a variation amount (a moving distance of a focus object position) due to the movement of the focus lens 111 during an exposure time of a frame is within a range of a depth of field at a focus object position corresponding to each of the focus positions. When the variation amount of the focus object position exceeds the range of the depth of field, the first method is set.

As described above, in the second method, the controller 180 performs the focus bracket capturing, always moving the focus lens 111 without stopping the focus lens 111 at the barycenter position of exposure in the CMOS 140 from the focus position (Pnear) on the near end side to the focus position (Pfar) on the most-infinite end side. Therefore, as compared with the first method in which the controller 180 performs the focus bracket capturing with the focus lens 111 stopped at each focus position, the second method can shorten a time required for the focus bracket capturing. Note that, in the second method, a focus position always varies because the focus lens 111 is always moved during the capturing. However, the operation of the second method is performed, when the variation amount of a focus object position due to the movement of the focus lens 111 during the exposure time of each frame is within the range of a depth of field at the focus object position corresponding to the focus position of each frame. Accordingly, even when the focus lens 111 is always moved without stopping during the focus bracket capturing, a frame image having certain focus precision can be obtained.

In the first method, the controller 180 performs the focus bracket capturing, with the focus lens 111 stopped at each focus position. Therefore, each captured frame image has more excellent focus precision than that of each captured frame image in the second method. Therefore, an image, which is superior in the image quality for focus precision to the image obtained in the second method, is obtained.

When the object is moving, that is, not stationary, performing the video capturing with the first method causes blur on the object recorded in each frame image due to movement of the object itself. As a result, the obtained image easily becomes slightly out of focus. Further, when the object is moving, the position of the object changes between the different images obtained by focus bracket capturing. Therefore, in the automatic mode, when the object is not stationary, the video capturing is performed by the second method in order to shorten the capturing time as far as possible.

Figure 10C:
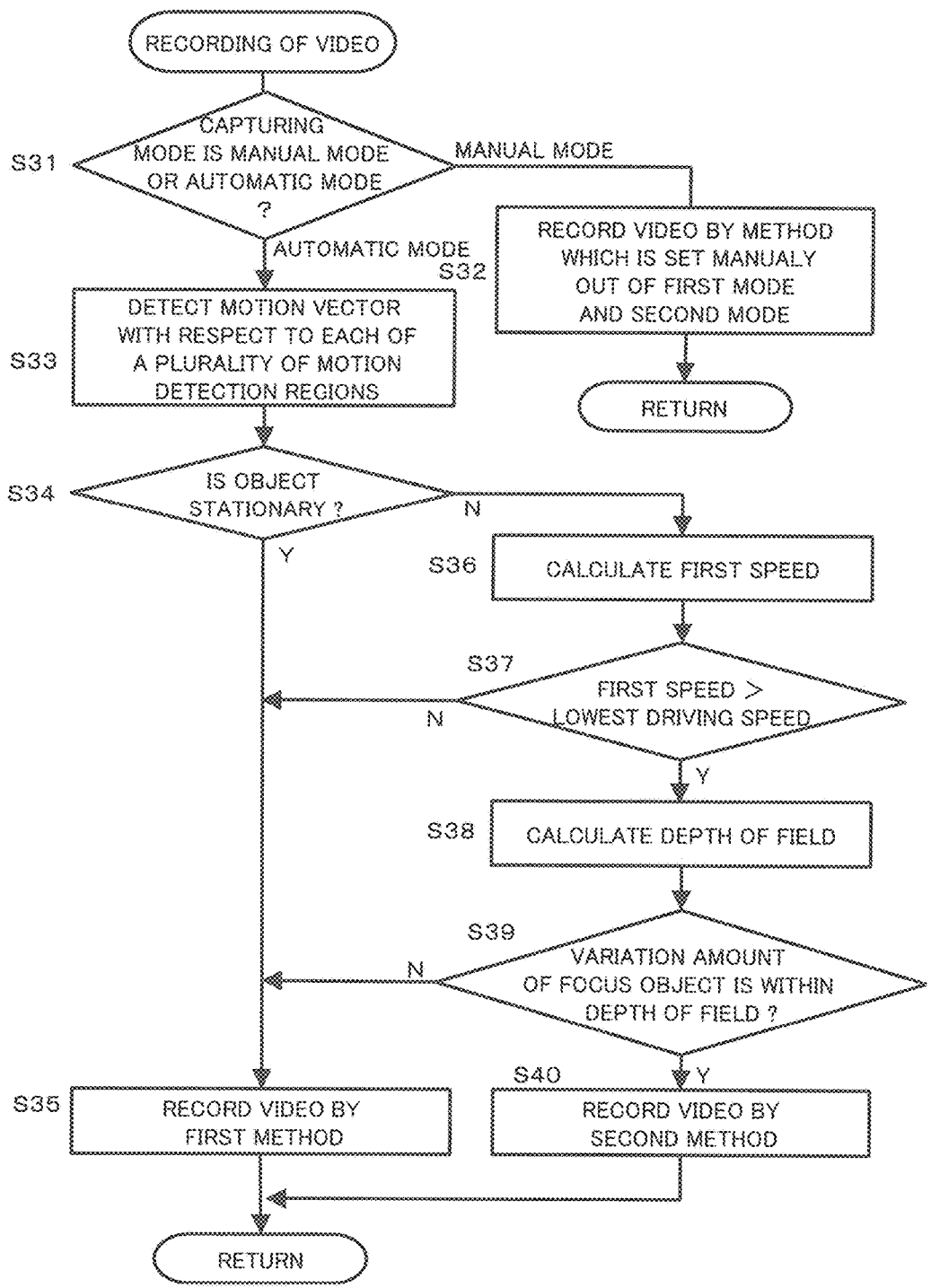
FIG. 10C is a flowchart illustrating a detailed operation of a video recording.

Next, the above video capturing operation (corresponding to the operation in step S12 in FIG. 8) will be described in more detail, with reference to a flowchart in FIG. 10C. When a video capturing starting operation via the operation member 210 is done, the controller 180 determines which one of the automatic mode and the manual mode is set as a mode for setting a video capturing method (S31). When the manual mode is set, the controller 180 performs the video capturing by a method which is manually set by the user out of the first method and the second method.

On the other hand, when the automatic mode is set, the controller 180 detects movement of the object (S33), and determines whether or not the object is stationary (S34). The controller 180 detects an amount of movement (referred to as a motion vector) within a predetermined time, of a representative point in each of a plurality of regions in which movement is detected, for example. When the motion vector is 0 in all the motion detection regions, the controller 180 determines that the object is stationary. The predetermined time is set to a time which is a multiple of $\frac{1}{30}$ second when the video is a 30 fps video, for example.

When it is determined that the object is stationary (YES in S34), the controller 180 performs the video capturing by the first method.

On the other hand, when it is determined that the object is not stationary but is moving (NO in S34), the controller 180 calculates the first speed V1 at which the focus lens 111 is moved (the focus lens position is changed at a certain speed) by the second method (S37). As shown in FIG. 10B, the first speed V1 is set to a speed at which the focus lens 111 can pass each of the adjacent focus positions at an approximately center timing of the exposure time of each frame.

The controller 180 determines whether or not the calculated first speed V1 is equal to or higher than the lowest driving speed of the focusing motor 121 (S37).

When the calculated first speed V1 is equal to or higher than the lowest driving speed of the focusing motor 121 (YES in S37), the controller 180 calculates a depth of field (S38). The depth of field can be calculated by a known method based on a focal distance of the optical system 110, an aperture value of the diaphragm 300, a focus position, and the like.

When the obtained first speed V1 is lower than the lowest driving speed of the focusing motor 121 (NO in S37), the controller 180 performs the video capturing by the first method (S35).

The controller 180 determines whether or not a variation amount of a focus object position (a moving distance of the focus object position) during the exposure time for each frame image, that is, the movement of the focus lens position, due to the movement of the focus lens 111, is within a range of a depth of field which exists around each focus object position (S39). That is, the controller 180 determines whether or not the variation amount of the focus object position is within the range of the depth of field at each focus object position. This is because when the variation amount of the focus object position during the exposure time exceeds the range of the depth of field, the object of the captured frame image becomes out of focus. Each variation amount of each focus object position corresponding to each focus lens position can be obtained from a table as shown in FIG. 10D, for example, which records the variation amount associated with the focus lens position in advance.

When the variation amount of the focus object position is within the range of the depth of field (YES in S39), the controller 180 performs the video capturing by the second method (S40). When the variation amount of the focus object position exceeds the range of the depth of field (NO in S39), the controller 180 performs the video capturing by the first method (S35).

Figure 10E:
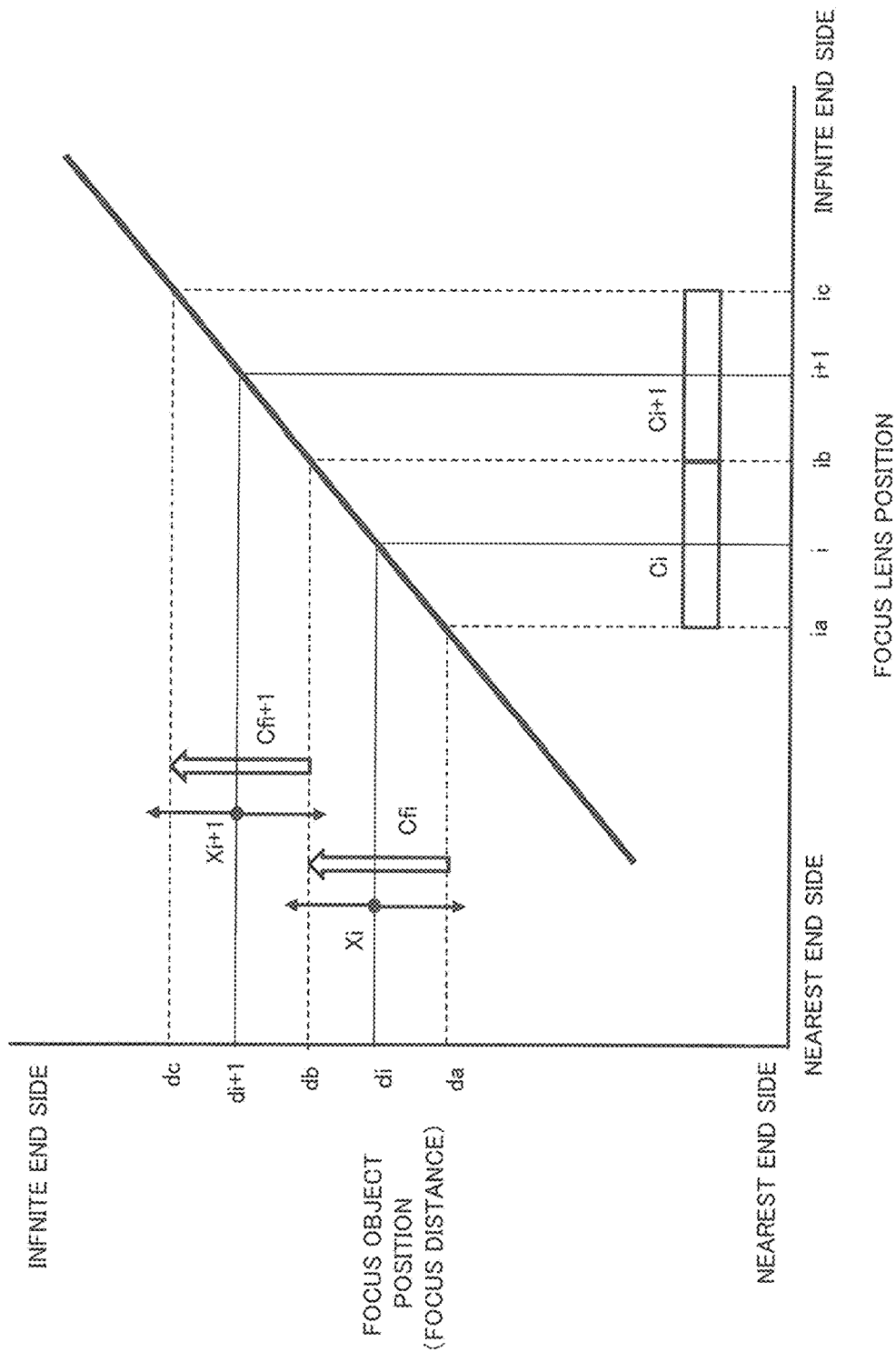
FIG. 10E is an explanatory diagram describing a relationship between a focus lens position and a focus object position.

FIG. 10E is a diagram for explaining the change of the focus object position when the focus lens position is moved, in further detail. FIG. 10E shows an example in which the focus lens 111 moves passing through two adjacent focus lens positions (focus positions) of i and i+1. At the focus position i, an object that exists at a focus object position di is in focus. At the focus position i+1, an object that exists at a focus object position di+1 is in focus. The focus lens position changes from ia to ib during an exposure time Ci of a frame image corresponding to the focus lens position (the focus position) i. At this time, the focus object position changes from da to db. The focus lens position changes from ib to ic during an exposure time Ci+1 of a frame image corresponding to the focus lens position (the focus position) i+1. At this time, the focus object position changes from db to dc. The depth of field at the focus position i has a range of Xi around the focus position i in back-and-forth. The depth of field at the focus position i+1 has a range of Xi+1 around the focus position i+1 in back-and-forth. In this case, a variation amount (a moving distance) of the focus object position in the exposure time Ci of the frame image corresponding to the focus lens position (the focus position) i is Cfi (=da−db), which is within the range of the depth of field Xi at the focus position i. Further, a variation amount (a moving distance) of the focus object position during the exposure time Ci+1 of the frame image corresponding to the focus lens position (the focus position) i+1 is Cfi+1 (=db−dc), which is within the range of the depth of field Xi+1 at the focus position i+1. In this case, the video capturing is performed by the second method.

Figure 10F:
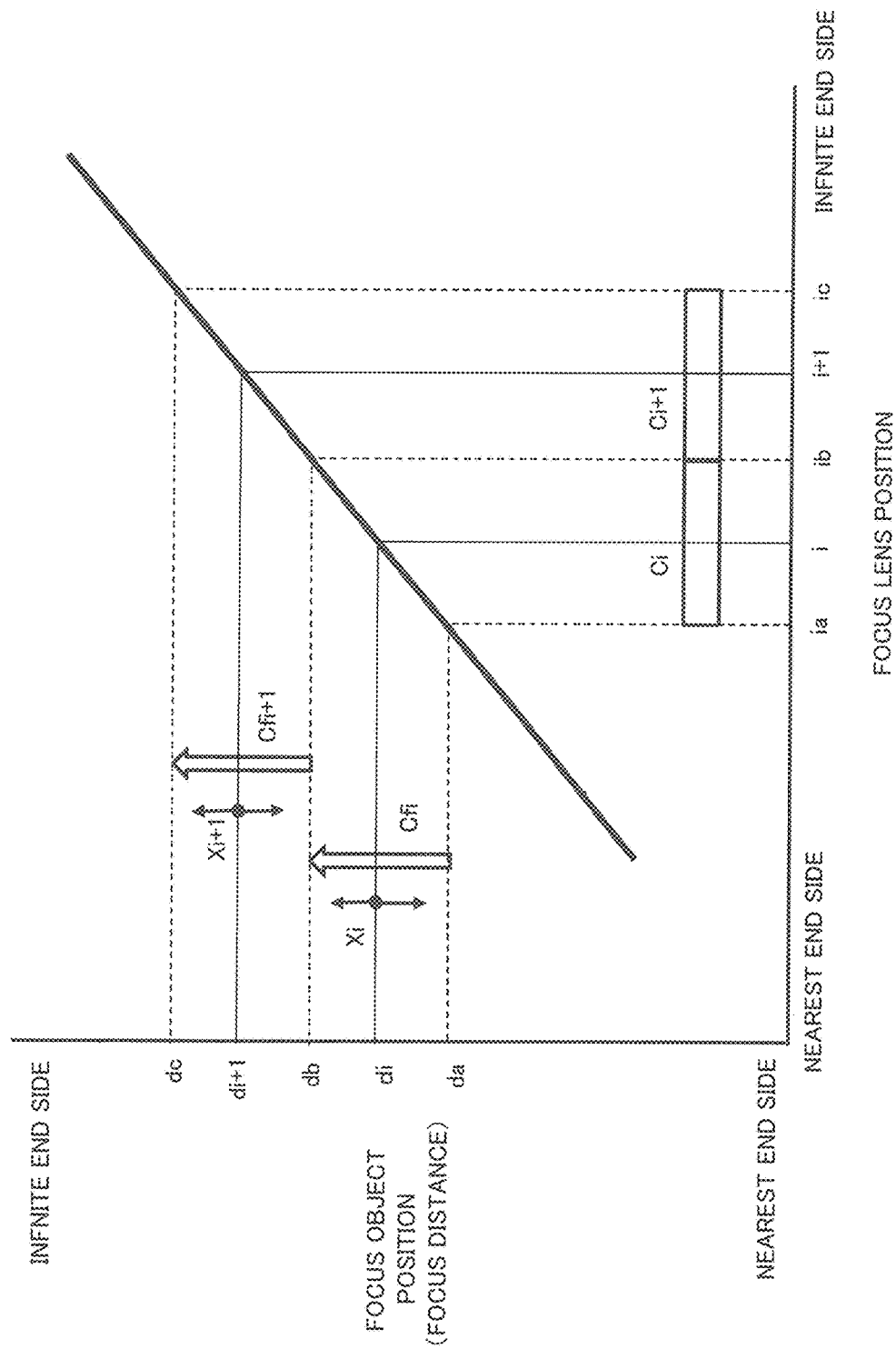
FIG. 10F is an explanatory diagram describing a relationship between a focus lens position and a focus object position.

FIG. 10F is a diagram for explaining the change of the focus object position when the focus lens position is moved, in further detail. FIG. 10F is substantially the same as FIG. 10E, except the following. The variation amount (the moving distance) Cfi (=da−db) of the focus object position during the exposure time Ci of the frame image corresponding to the focus lens position (the focus position) i exceeds the range of the depth of field Xi at the focus position i. Further, the variation amount (the moving distance) Cfi+1 (=db−dc) of the focus object position during the exposure time Ci+1 of the frame image corresponding to the focus lens position (the focus position) i+1 exceeds the range of the depth of field Xi+1 at the focus position i+1. In this case, the video capturing is performed by the first method instead of the second method.

As described above, the controller 180 detects a focus position in each partial region, thereafter moves the focus lens 111 to each focus position and performs the video capturing. Further, the digital camera 100 has the first method in which the video capturing is performed with the focus lens 111 stopped at the focus position, and the second method in which the video capturing is performed with the focus lens 111 being always moved. Therefore, when the first method is set as a video capturing method, the digital camera 100 can capture images having high focus precision and an excellent image quality. Further, when the second method is set as the video capturing method, the digital camera 100 can shorten a video recording time, compared with the first method. Therefore, it is possible to capture images according to a priority with respect to an image quality and a recording time.

2.2 Generation of Still Image from Video-Image Data

Figure 11:
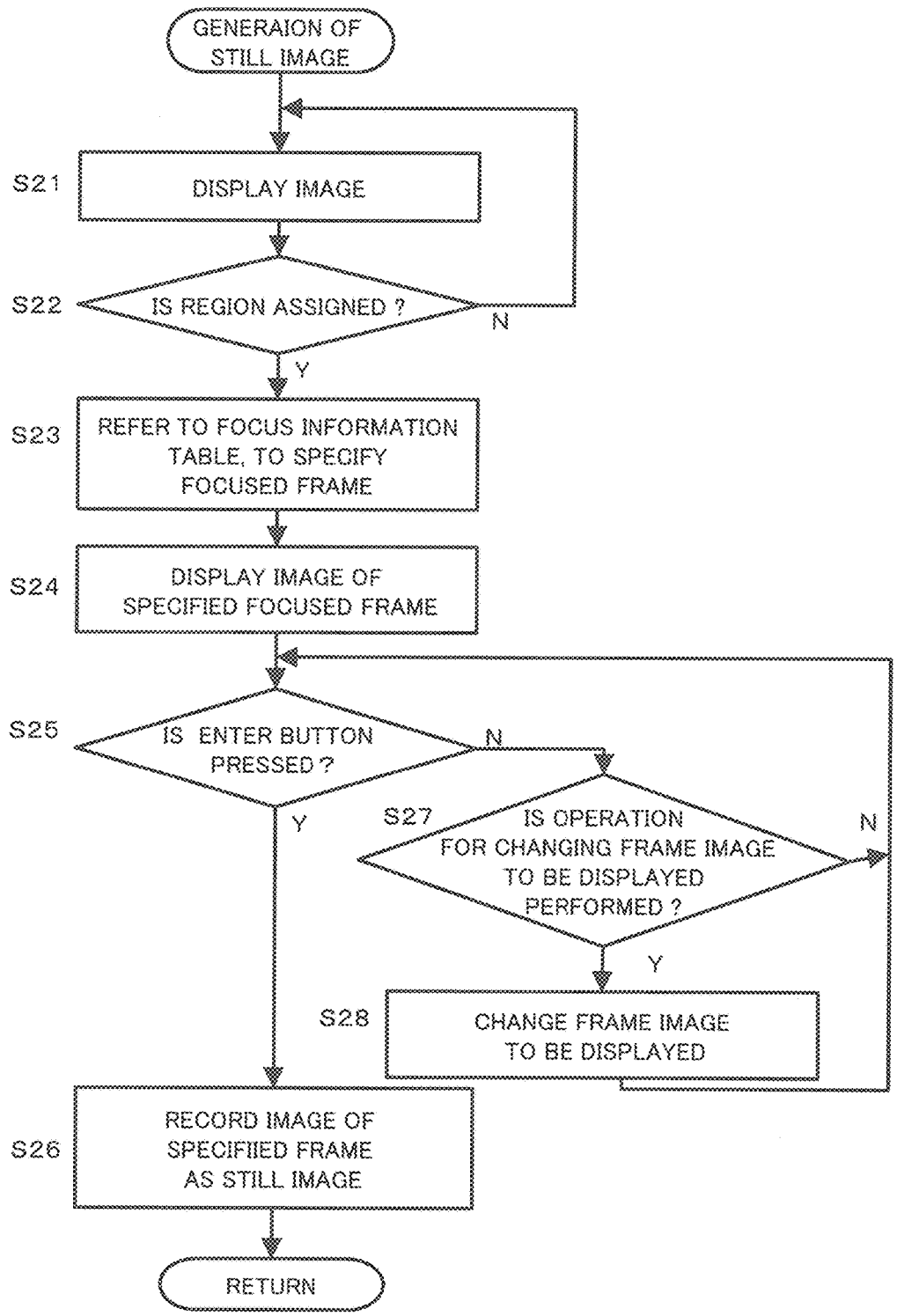
FIG. 11 is a flowchart illustrating a process of generating a still image from video-image data.

The still-image generation operation (step S02) will be described with reference to a flowchart in FIG. 11. In the still-image generation operation, a still image which is focused on an object (a region) assigned by the user is generated from a video captured by the video recording operation.

Figure 12:
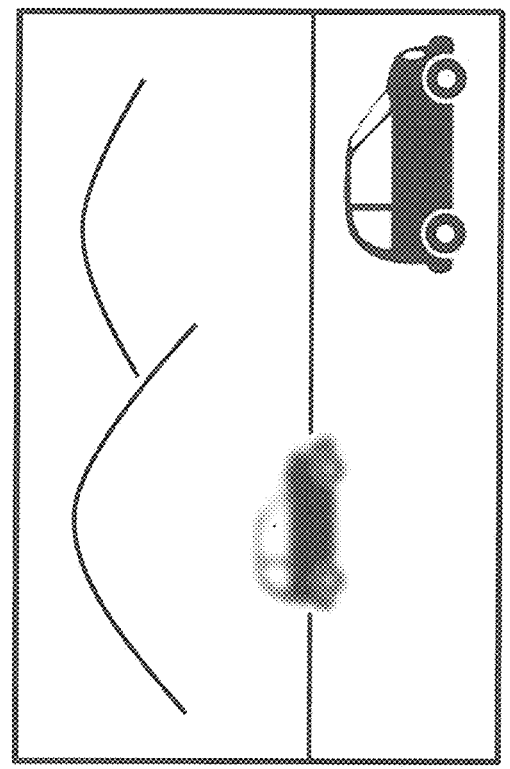
FIG. 12 is a view describing a screen displayed after video-image data is recorded.

The controller 180 displays the video which is recorded immediately before, on the display monitor 220 (S21). For example, as shown in FIG. 12, the video recorded immediately before is displayed on the display monitor 220. At this time, one frame image (a still image) of a plurality of frame images constituting the recorded video may be displayed.

Figure 13A:
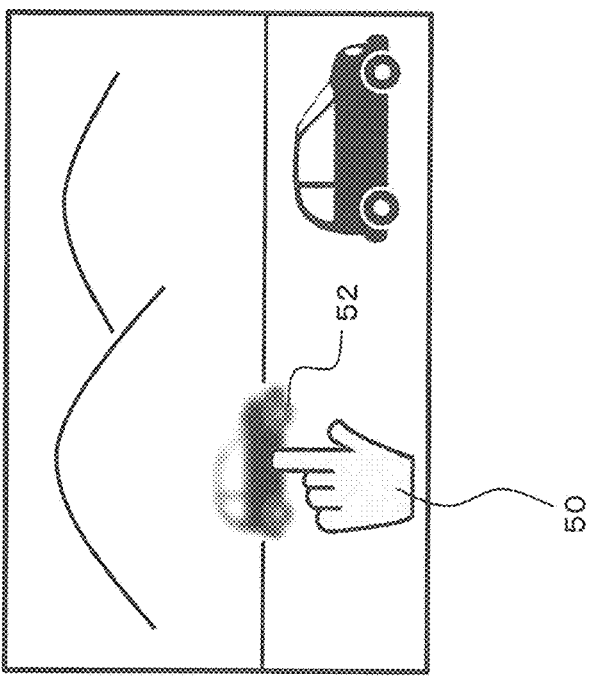
FIG. 13A is an explanatory view of assignment by the user of a desired object.

The user operates the touch panel 222 provided on the back surface of the camera, to assign an object (that is, a region) on which the user desires to focus, on the displayed image. For example, the user 50 touches the object 52 to assign the object 52 as a target (a region) on which the user desires to focus as shown in FIG. 13A.

Figure 13B:
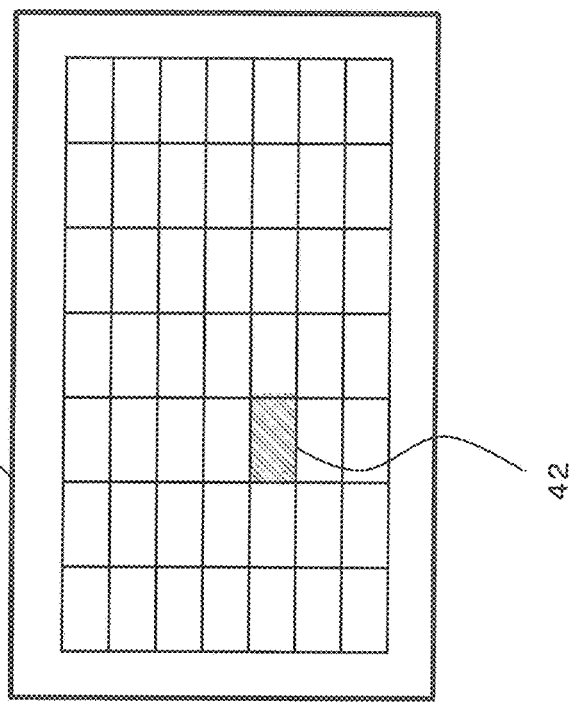
FIG. 13B is a diagram describing a region corresponding to an object assigned by the user.

When an object (that is, a region) is assigned by the user (YES in S22), the controller 180 refers to the focus information table 60, to specify a focused frame with respect to the region assigned by the user (S23). For example, when the object 52 is assigned by the user as shown in FIG. 13A, the controller 180 specifies a region 42 corresponding to the object 52 as shown in FIG. 13B, and refers to the focus information table 60, to obtain a frame number of a focused frame with respect to the region 42.

Figure 14A:
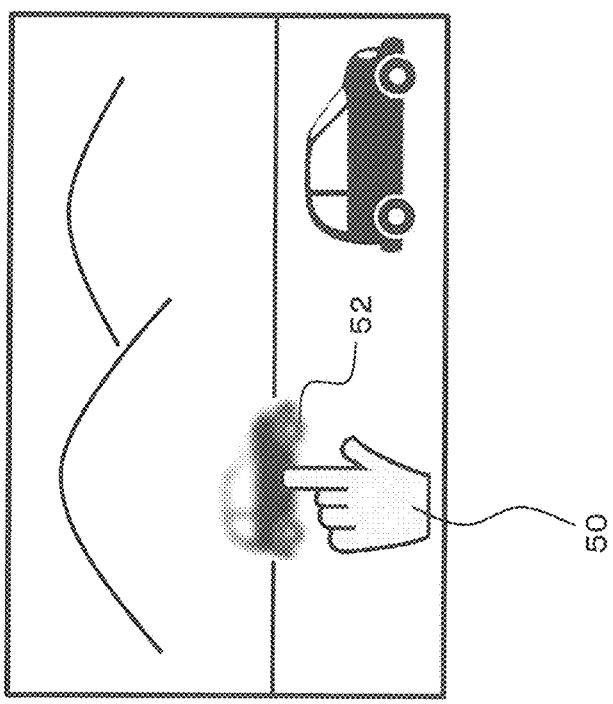
FIG. 14A is an explanatory view of assignment by the user of a desired object.
Figure 14B:
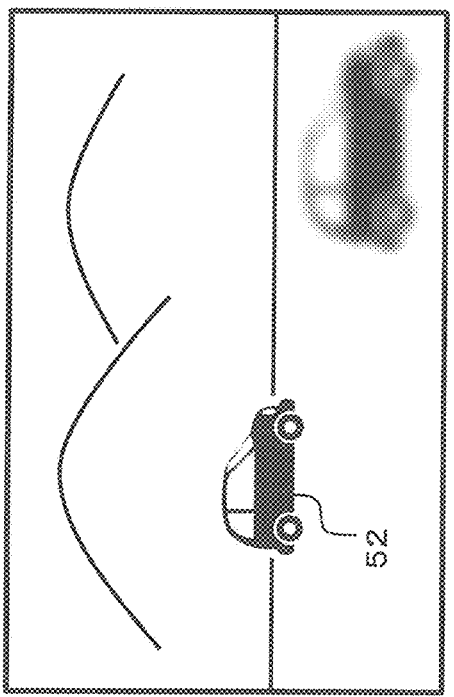
FIG. 14B is a view describing a display example of an image having a focus on an object assigned by the user.

Then, the controller 180 displays a frame image of the specified frame number on the display monitor 220 (S24). For example, when the object 52 is assigned by the user in the image shown in FIG. 14A, an image which is focused on the assigned object 52 is displayed as shown in FIG. 14B.

When the image displayed on the display monitor 220 is a desired image, the user can determine this image as a still image to be recorded, by pressing the enter button 214. On the other hand, when the image displayed on the display monitor 220 is not a desired image, the user can change an image to be displayed on the display monitor 220 from the displayed image to a frame image which is temporally before or after the displayed image, by operating the selection buttons 213.

When the operation for changing the displayed image is performed by the user (S27), the controller 180 changes the image to be displayed on the display monitor 220 according to the operation (S28). The user can cause the display monitor 220 to display the desired image by performing the changing operation appropriately.

When the enter button 214 is pressed by the user (S25), a displayed image (a frame image) is cut out as a still image, and is recorded into the memory card 200 (S26). For example, when the enter button 214 is pressed by the user, a confirmation message to the user is displayed on the display monitor 220. When an instruction ("Yes") to the confirmation message is input by the user, the controller 180 may obtain data of the displayed frame image from video-image data and record the obtained data into the memory card 200 as a still image. Still-image data may be recorded into the internal memory 240 or other recording medium in place of or in addition to the memory card 200.

The video-image data is recorded according to a video format (MP4) and subjected to interframe compression. For this reason, when cutting out a frame of video data as a still image, the controller 180 converts data of the frame into data having a still-image format (e.g., JPEG), to record the converted data.

In this way, the still-image data which is focused on the region assigned by the user can be cut out from the video image data. That is, the user can obtain the image which is focused on the desired object.

As described above, the digital camera 100 of the present embodiment extracts a frame image (a focused frame) which is focused on the region assigned by the user, from the video-image data which is captured by changing the focus position, and records the extracted frame image as a still image. Therefore, the user can easily obtain a still image which is focused on a desired image region (an object) by touching the image region to assign it. Further, a still image is generated from a video captured with the focus position being changed, so that an image which is focused on an arbitrary object included in a field angle during the video capturing can be obtained.

3. Effects and Others

The digital camera 100 of the present embodiment includes: the optical system 110 including the focus lens 111; the CMOS 140 (an example of a imaging unit) that captures an object image formed by the optical system 110 to generate an image signal; the image processor 160 that performs a predetermined process to the image signal generated by the CMOS 140 to generate image data; and the controller 180 (an example of a controller) that controls the CMOS 140 and the image processor 160. In the case in which a plurality of regions which is obtained by dividing an image region of the image data is set as partial regions, the controller 180 detects focus positions respectively with respect to the partial regions and moves the focus lens 111 to each of the detected focus positions to capture a video. The controller has, as a video capturing method for the video capturing, a first method in which the video capturing is performed with the focus lens 111 stopped at each of the focus positions, and a second method in which the video capturing is performed with the focus lens 111 being moved without stopped at each of the focus positions.

The digital camera 100 of the present embodiment can capture images of high focus precision and an excellent image quality by setting the first method as a video capturing method. Further, the digital camera 100 can shorten the recording time for the video capturing than the first method by setting the second method as the video capturing method. Therefore, a capturing according to a priority with respect to an image quality and a recording time can be performed.

Further, the controller 180 detects whether or not the object is stationary based on the image data, sets the first method as the video capturing method when the object is stationary, and sets the second method as the video capturing method when the object is not stationary. Therefore, a proper video capturing method can be automatically set according to whether or not the object is stationary.

Further, on the assumption that the video capturing is performed by the second method with the focus lens 111 being moved, when an variation amount during an exposure time of a frame, with respect to each of focus object positions respectively corresponding to the focus positions, exceeds a range of depth of field at each of the focus positions, the controller 180 performs the video capturing by the first method. Therefore, a proper video capturing method can be set according to the depth of field.

Further, the controller 180 sets the first method as a video capturing method, when a moving speed at which the focus lens 111 is moved by the second method is lower than a settable lowest driving speed. Therefore, when the depth of field is particularly small, the video capturing is performed by the first method instead of the second method. Thus, even when the depth of field is particularly small, a properly focused image can be obtained.

The digital camera 100 further includes the operation member 210 for manually setting any one of the first method and the second method as the video capturing method to the controller 180. Therefore, the user can selectively utilize the first method or the second method according to a purpose.

The digital camera 100 further includes the operation member 210 that accepts an operation from a user. The operation member 210 accepts an assignment of a region in an image from the user. The controller 180 extracts a frame image (a focused frame) which is focused on the region assigned by the user, from a plurality of frame images constituting recorded video-image data, and records the extracted frame image as a still image into the memory card 200 (an example of a predetermined recording medium). Therefore, the user can record a desired frame image as a still image into the memory card 200.

Other Embodiments

The first embodiment is described above as exemplification of a technique disclosed in the present application. However, the technique in the present disclosure can be also applied to an embodiment in which change, replacement, addition, and omission are appropriately performed, in addition to the first embodiment. Further, a new embodiment can be also prepared by combining constituent elements described in the first embodiment. Other embodiments will be exemplified below.

(1) In the above embodiment, in the focus bracket operation, the pre-scanning operation is performed before the video recording to prepare the focus information table 60. The pre-scanning operation makes it possible to recognize a focus position of a boundary at which a focus is obtained. Therefore, a valid range of moving the focus lens 111 at the video recording time can be set. Consequently, there is an advantage of being able to efficiently perform the video recording. Further, the focus information table 60 may be generated, by not the pre-scanning operation, but by using a phase difference sensor or an image-recognizing technique such as a Depth from Defocus (DFD) technique for measuring a distance of a target image.

(2) In the above embodiment, the focus information table 60 stores the focus position (Pnear) which is nearest the near end and the focus position (Pfar) which is nearest the infinite end. However, these focus positions (Pnear, Pfar) are not necessarily required to be stored in the focus information table 60, and may be held independently of the focus information table 60.

(3) In the above embodiment, the focus information table 60 stores information (a frame number) with respect to each of image regions which indicates a frame that is focused on the region (a focused frame). However, the focus information table 60 is not limited to this configuration. The focus information table may store a position of the focus lens 111 with respect to each of the image regions, each position being a position in a state where each of the image regions is focused. In this case, there may be prepared a second table that indicates a relationship between a focus lens position and each frame at a video recording time. Further, when cutting out a still image, a frame image to be cut out from a video can be specified by referring to the focus information table and the second table.

(4) In the above embodiment, contrast AF is used as an auto-focusing system. Alternatively, phase difference AF may be also used.

(5) The focus bracket function disclosed in the above embodiment can be applied to both kinds of digital cameras of an interchangeable lens camera and a lens-integrated type camera.

(6) In the above embodiment, the digital camera is described as an example of the imaging device. However, the imaging device is not limited to a digital camera. The idea of the present disclosure can be applied to various imaging devices that can capture a video such as a digital video camera, a smartphone, and a wearable camera.

(7) In the above embodiment, an imaging element of the imaging unit is configured by a CMOS. However, the imaging element of the imaging unit is not limited to a CMOS in the present disclosure. In the present disclosure, the imaging element of the imaging unit may be an NMOS image sensor or a CCDS image sensor. In this case, the CMOS 140 in the above embodiment may be read as the NMOS image sensor or the CCD image sensor.

(8) In the above embodiment, the first method and the second method are changed according to whether or not the object is stationary. However, it may be determined according to whether or not the camera detects a blur. Further, in the case of an interchangeable lens system, the first method and the second method may be changed according to the attached interchangeable lens. The information of a focal distance and an aperture value of the attached interchangeable lens may be obtained from the controller of the interchangeable lens or the like. For example, there is a case where it takes time to move the focus lens due to the attached interchangeable lens. In this case, a capturing time can be shortened by exclusively applying the second method. An interchangeable lens having a small maximum aperture may have a very small depth of field. In this case, the capturing operation may be performed by the first method as described in the first embodiment. Because, in the second method, a variation amount of a focus object position during an exposure time easily exceeds the range of the depth of field at the focus object position of each frame image.

(9) In the above embodiment, the focus lens 111 is moved by the first method or the second method during the period in which the focus lens 111 is moved from the focus position (Pnear) on the near end side, to the focus position (Pfar) on the most-infinite end side. However, it may be monitored whether or not the object is stationary during the period from in which the focus lens 111 is moved from the focus position (Pnear) on the near end side, to the focus position (Pfar) on the most-infinite end side, and the first method and the second method may be changed according to whether or not the object is stationary, for example.

The embodiment is described above as exemplification of the technique in the present disclosure. For this purpose, the appended drawings and the detailed description are provided. Therefore, the constituent elements described in the appended drawings and the detailed description also include, not only constituent elements which are necessary to solve the problems, but constituent elements which are not essential to solve the problems, to exemplify the above technique. Accordingly, because of the not essential constituent elements being described in the appended drawings and the detailed description, these not essential constituent elements should not be admitted as essential. Further, because the above embodiment is for exemplifying the technique in the present disclosure, various kinds of change, replacement, addition, and omission can be performed in claims or in an equivalent range of the claims.

INDUSTRIAL APPLICABILITY

The present disclosure can be applied to an imaging device that can capture a video. Specifically, the present disclosure can be applied to various imaging devices that can capture a video such as a digital video camera, a smartphone, and a wearable camera.

What is claimed is:

1. An imaging device comprising:
   an imaging unit that captures an object image formed by an optical system to generate an image signal;
   an image processor that performs a predetermined process to the image signal generated by the imaging unit to generate image data; and
   a controller that controls the imaging unit and the image processor, wherein
   in the case in which a plurality of regions which is obtained by dividing an image region of the image data is set as partial regions,
   the controller detects a focus position with respect to each of the partial regions and moves a focus lens to each of the detected focus positions to capture a video,
   the controller has, as a video capturing method for the video capturing, a first method in which the video capturing is performed with the focus lens stopped at each of the focus positions, and a second method in which the video capturing is performed with the focus lens being moved without stopped at each of the focus positions.

2. The imaging device according to claim 1, wherein
   the controller
   detects whether or not the object is stationary based on the image data,
   sets the first method as the video capturing method when the object is stationary, and
   sets the second method as the video capturing method when the object is not stationary.

3. The imaging device according to claim 1, wherein
   on the assumption that the video capturing is performed by the second method with the focus lens being moved, when an variation amount during an exposure time of a frame, which is with respect to each of focus object positions respectively corresponding to the focus positions, exceeds a range of depth of field at each of the focus positions, the controller performs the video capturing by the first method.

4. The imaging device according to claim 3, wherein
   the controller sets the first method as the video capturing method, when a moving speed at which the focus lens is moved by the second method is lower than a settable lowest driving speed.

5. The imaging device according to claim 1, further comprising
   an operation member for manually setting any one of the first method and the second method as the video capturing method to the controller.

6. The imaging device according to claim 1, further comprising
   an operation member that accepts an operation from a user, wherein
   the operation member accepts an assignment of a region in an image from the user, and
   the controller extracts a frame image which is focused on the region assigned by the user, from a plurality of frame images which constitute recorded video-image data, and records the extracted frame image as a still image into a predetermined recording medium.

7. The imaging device according to claim 1, further comprising
   the optical system that includes the focus lens.

* * * * *